(12) United States Patent
Shibasaki

(10) Patent No.: US 7,701,494 B2
(45) Date of Patent: Apr. 20, 2010

(54) IMAGE PICKUP DEVICE AND NOISE REDUCTION METHOD THEREOF

(75) Inventor: Tetsuya Shibasaki, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 541 days.

(21) Appl. No.: 11/564,000

(22) Filed: Nov. 28, 2006

(65) Prior Publication Data
US 2007/0153103 A1 Jul. 5, 2007

(30) Foreign Application Priority Data
Nov. 29, 2005 (JP) .............................. 2005-342973

(51) Int. Cl.
H04N 5/217 (2006.01)
(52) U.S. Cl. .................................... 348/241
(58) Field of Classification Search ................. 348/241, 348/249, 311
See application file for complete search history.

(56) References Cited

U.S. PATENT DOCUMENTS

| | | | |
|---|---|---|---|
| 4,608,608 A * | 8/1986 | Nishizawa et al. .......... | 348/248 |
| 4,974,066 A * | 11/1990 | Tusji .......................... | 348/242 |
| 6,215,520 B1 | 4/2001 | Taniji | |
| 2003/0042400 A1 * | 3/2003 | Hynecek ................... | 250/208.1 |
| 2004/0169896 A1 * | 9/2004 | Kondo ........................ | 358/482 |
| 2005/0073597 A1 * | 4/2005 | Rengakuji et al. ........... | 348/241 |
| 2005/0151057 A1 * | 7/2005 | Hillis et al. .............. | 250/208.1 |

FOREIGN PATENT DOCUMENTS

| | | |
|---|---|---|
| EP | 0398228 A3 | 11/1990 |
| JP | 7-23283 | 1/1995 |
| WO | 2005013605 A1 | 2/2005 |

* cited by examiner

*Primary Examiner*—Tuan Ho
(74) *Attorney, Agent, or Firm*—Brundidge & Stanger, P.C.

(57) ABSTRACT

An image pickup device having an electron multiplying-charge coupled device has: an electron multiplying magnification control unit of the electron multiplying-charge coupled device; an obtaining unit for obtaining signals which are outputted from light-shielded pixels of the electron multiplying-charge coupled device; an averaging unit for executing an inter-line averaging process to the signals obtained by the obtaining unit; a suppression unit for performing a predetermined low-level suppression and a predetermined high-level suppression to the signal averaged by the averaging unit in accordance with the electron multiplying magnification of the electron multiplying magnification control unit; a deriving unit for deriving image signals which are outputted from light-unshielded pixels of the electron multiplying-charge coupled device; and a subtraction unit for subtracting the signal suppressed by the suppression unit from the image signals derived by the deriving unit.

11 Claims, 8 Drawing Sheets

FIG. 3

| | 1ST LINE | 2ND LINE | 3RD LINE | | nTH LINE | 1ST LINE | 2ND LINE | 3RD LINE | | NTH LINE |
|---|---|---|---|---|---|---|---|---|---|---|
| | B11 | B21 | B31 | ---- | Bn1 | S11 | S21 | S31 | ------ | SN1 |
| | B12 | B22 | B32 | ---- | Bn2 | S12 | S22 | S32 | ------ | SN2 |
| | B13 | B23 | B33 | ---- | Bn3 | S13 | S23 | S33 | ------ | SN3 |
| | B14 | B24 | B34 | ---- | Bn4 | S14 | S24 | S34 | ------ | SN4 |
| | B15 | B25 | B35 | ---- | Bn5 | S15 | S25 | S35 | ------ | SN5 |
| | : | : | : | : : | : | : | : | : | : : | : |
| | B1M | B2M | B3M | ---- | BnM | S1M | S2M | S3M | ------ | SNM |

OPTICAL BLACK AREA | IMAGE PICKUP AREA

IMAGE PICKUP DEVICE AND NOISE REDUCTION METHOD THEREOF

INCORPORATION BY REFERENCE

The present application claims priority from Japanese application JP2005-342973 filed on Nov. 29, 2006, the content of which is hereby incorporated by reference into this application.

BACKGROUND OF THE INVENTION

1. Field of the Invention

The invention relates to an image pickup device such as a television camera or the like having a charge coupled device and, more particularly, to a method of reducing noises such as a smear and the like contained in an image signal which is outputted from an electron multiplying-charge coupled device.

2. Description of the Related Art

Hitherto, there has been an image pickup device constructed in such a manner that an optical image is formed/provided by a lens onto a charge coupled device for converting light into an electric signal, wherein an adjusting apparatus for adjusting a transmission light amount is provided on an optical path corresponding to each minimum block of the charge coupled device, and the adjusting apparatus has: a control function for reducing a reception light amount of each photoelectric conversion unit of the charge coupled device into $1/\alpha$ ($\alpha$ is an integer of 1 or more) so as not to be deviated from a dynamic range that is peculiar to the charge coupled device; and a function for amplifying an output corresponding to each of the minimum blocks by $\alpha$ times at the post stage of the charge coupled device (for example, refer to JP-A-7-023283).

SUMMARY OF THE INVENTION

According to the foregoing related art, in order to reduce the noises such as a smear and the like, it is necessary to provide the adjusting apparatus for adjusting the transmission light amount for the optical path corresponding to each minimum block of the charge coupled device.

It is one of objects of the invention to reduce noises such as a smear and the like which are outputted from a charge coupled device without providing a special light amount adjusting apparatus.

According to the invention, there is provided an image pickup device having an electron multiplying-charge coupled device, comprising: an electron multiplying magnification control unit of the electron multiplying-charge coupled device; an obtaining unit for obtaining signals which are outputted from light-shielded pixels of the electron multiplying-charge coupled device; an averaging unit for executing an inter-line averaging process to the signals obtained by the obtaining unit; a suppression unit for performing a predetermined low-level suppression and a predetermined high-level suppression to the signal averaged by the averaging unit in accordance with the electron multiplying magnification of the electron multiplying magnification control unit; a deriving unit for deriving image signals which are outputted from light-unshielded pixels of the electron multiplying-charge coupled device; and a subtraction unit for subtracting the signal suppressed by the suppression unit from the image signals derived by the deriving unit.

The image pickup device further comprises: a comparison unit for comparing a level of the signal averaged by the averaging unit with a predetermined level; and a switching unit for disconnecting outputs of the suppression unit in accordance with a comparison result of the comparison unit.

Further, there is provided a noise reduction method of an image pickup device having an electron multiplying-charge coupled device, comprising the steps of: controlling an electron multiplying magnification of the electron multiplying-charge coupled device; obtaining signals which are outputted from light-shielded pixels of the electron multiplying-charge coupled device; executing an inter-line averaging process to the obtained signals; performing a predetermined low-level suppression and a predetermined high-level suppression to the averaged signal in accordance with the electron multiplying magnification; deriving image signals which are outputted from light-unshielded pixels of the electron multiplying-charge coupled device; and subtracting the suppressed signal from the derived image signals.

The noise reduction method further comprises the steps of: comparing a level of the averaged signal with a predetermined level; and subtracting the suppressed signal from the derived image signals in accordance with a comparison result.

According to the invention, a smear signal is obtained from the light-shielded pixels of the charge coupled device, the low-level suppression and the high-level suppression are performed to the obtained smear signal in accordance with the image signal level of the light-unshielded pixels, and the suppressed smear signal is subtracted from the image signal level, so that the image signal in which the noises such as a smear signal and the like have been reduced is obtained.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram for explaining a pixel array of a charge coupled device;

DETAILED DESCRIPTION OF THE EMBODIMENTS

An embodiment of an image pickup device according to the invention will be described hereinbelow with reference to FIGS. 1 and 2.

Figure 1:
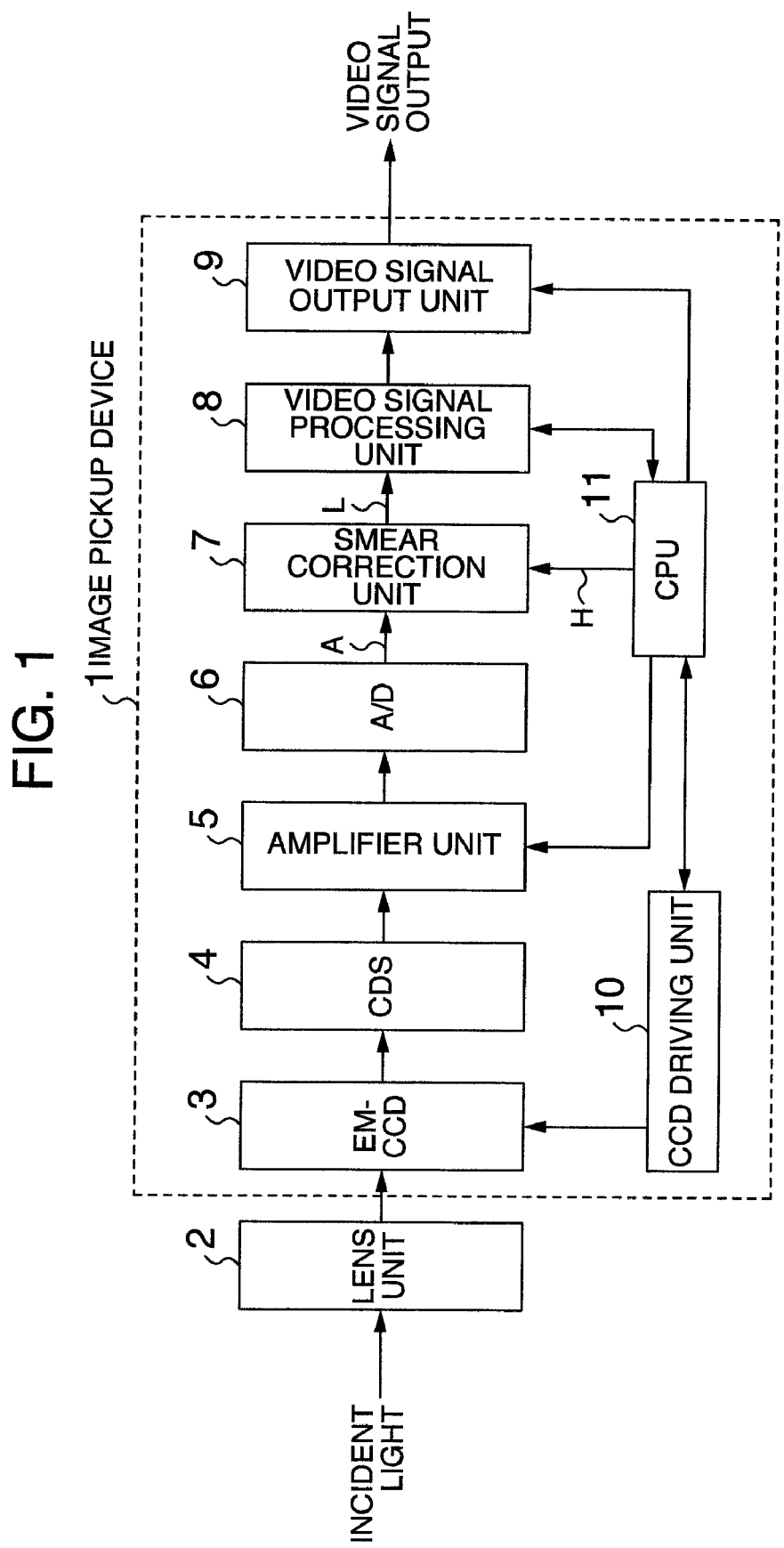
FIG. 1 is a block diagram showing an image pickup device of an embodiment of the invention.

FIG. 1 is a block diagram showing the image pickup device of the embodiment of the invention.

In FIG. 1, reference numeral 1 denotes an image pickup device; 2 denotes a lens unit for forming/providing an image of incident light; 3 denotes an EM-CCD (Electron Multiplying-Charge Coupled Device) for converting the light entering from the lens unit 2 into an electric signal; 4 denotes a CDS (Correlated Double Sampling) unit for eliminating noises from the signal outputted from the EM-CCD 3; 5 denotes an amplifier unit for adjusting a gain of the signal outputted from the CDS unit 4; 6 denotes an A/D conversion unit (Analog Digital Converter) for converting an analog signal outputted from the amplifier unit 5 into a digital signal A; 7 denotes a smear correction unit for detecting and correcting a noise signal such as a smear or the like which is outputted from the EM-CCD 3; 8 denotes a video signal processing unit for executing various image processes to a signal L outputted from the smear correction unit 7; 9 denotes a video signal output unit for converting the signal outputted from the video signal processing unit 8 into a video signal of a predetermined system and outputting it; 10 denotes a CCD driving unit for driving the EM-CCD 3 and making gain control of the electron multiplication; and 11 denotes a CPU (Central Processing Unit) for controlling each unit in the image pickup device 1. The CPU 11 also controls the smear correction unit 7 by a signal H.

The video signal of the predetermined system which is outputted from the video signal output unit 9 is a motion image or a still image of, for example, an NTSC (National Television System Committee) system, a PAL (Phase Alternating by Line) system, an HDTV (High Definition TeleVision) system, or the like.

Figure 2:
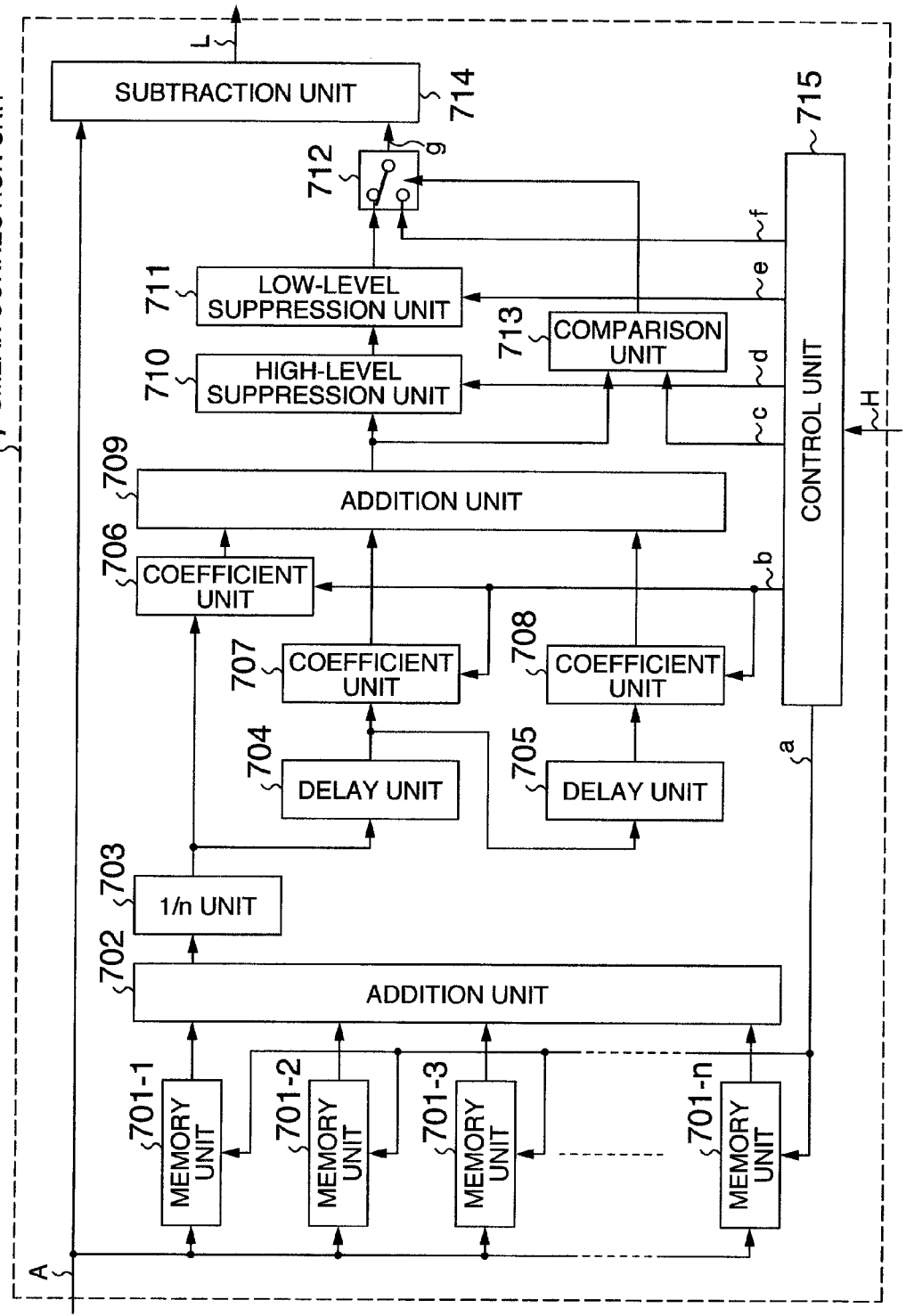
FIG. 2 is a block diagram showing a smear correction unit of the embodiment of the invention.

FIG. 2 is a block diagram showing detailed contents of the smear correction unit 7 in FIG. 1.

In FIG. 2, reference numerals 701-1 to 701-n (n is a natural number) denote memory units each for storing a digital signal of one scanning line (1H). Reference numeral 702 denotes an addition unit for adding output signals of the memory units 701-1 to 701-n; 703 denotes a 1/n unit for multiplying an output signal of the addition unit 702 by 1/n; 704 and 705 denote delay units each for delaying an input signal by the time corresponding to one pixel; 706 to 708 denote coefficient units each for setting an input signal to a predetermined magnification; 709 denotes an addition unit for adding output signals of the coefficient units 706 to 708; 710 denotes a high-level suppression unit for applying a first predetermined suppression to a signal which is outputted from the addition unit 709 and is equal to or higher than a first predetermined level; 711 denotes a low-level suppression unit for applying a second predetermined suppression to a signal which is outputted from the high-level suppression unit 710 and is equal to or less than a second predetermined level; 713 denotes a comparison unit for comparing a level of a signal which is outputted from the addition unit 709 with a predetermined signal level which is outputted from a control unit 715; 712 denotes a switching unit for switching a signal to be outputted in accordance with a comparison result which is outputted from the comparison unit 713; 714 denotes a subtraction unit for subtracting a signal (g) from the signal A; and 715 denotes the control unit for outputting signal(s) (a, b, c, d, e, and/or f) in accordance with an input signal.

The operation of the embodiment of the invention will now be described with reference to FIG. 1.

The EM-CCD 3 of the image pickup device 1 photoelectrically converts the incident light formed/provided as an image in the photoelectric conversion unit by the lens unit 2 and outputs the obtained electric signal to the CDS unit 4. The CDS unit 4 eliminates the noises from the signal outputted from the EM-CCD 3 and outputs the resultant signal to the amplifier unit 5. The amplifier unit 5 amplifies the signal outputted from the CDS unit 4 in accordance with a gain control signal which is outputted from the CPU 11 and outputs the amplified signal to the analog digital converter 6. The analog digital converter 6 converts the analog signal outputted from the amplifier unit 5 into the digital signal of, for example, 10 bits and outputs the signal A to the smear correction unit 7. The smear correction unit 7 performs the detection of the smear signal which is outputted from the EM-CCD 3 and the correction and outputs the signal L to the video signal processing unit 8. The video signal processing unit 8 executes the various image processes to the signal L outputted from the smear correction unit 7 and outputs the resultant signal to the video signal output unit 9. The video signal output unit 9 converts the signal outputted from the video signal processing unit 8 into the video signal of the predetermined format and outputs the video signal. The CCD driving unit 10 outputs a signal for driving the EM-CCD 3 in accordance with a control signal which is outputted from the CPU 11. The CPU 11 outputs the signal H for controlling the smear correction unit 7.

The CCD driving unit 10 transmits position information of the pixel which is read out of the EM-CCD 3 to the CPU 11, or the CPU 11 may instruct a reading start point of the video signal which is outputted from the EM-CCD 3 to the CCD driving unit 10. The CPU 11 outputs a signal for controlling an amplification factor in accordance with the image signal which is outputted from the video signal processing unit 8 to the amplifier unit 5 and outputs a signal for making the gain control of the electron multiplication of the EM-CCD 3 to the CCD driving unit 10. The CPU 11 multiplies the position information of the pixel which is read out of the EM-CCD 3 and the information of the gain ratio of the electron multiplication of the EM-CCD 3 to the signal H which is outputted and transmits the resultant signal to the control unit 715. On the basis of the signal H, the signal(s) (a, b, c, d, e, and/or f) are outputted from the control unit 715.

The smear will now be described. The smear is a blurred phenomenon of the light appearing in the upper and lower positions of a spotlight in the case where a high-luminance object like a spotlight is photographed by the charge coupled device. The smear occurs even in the illuminance which is equal to or less than the saturated illuminance of the charge coupled device. The smear is proportional to the illuminance of the light upon photographing. The smear exercises an influence on all pixels in the same vertical direction as that of the pixel whose spotlight has been photographed.

Figure 4:
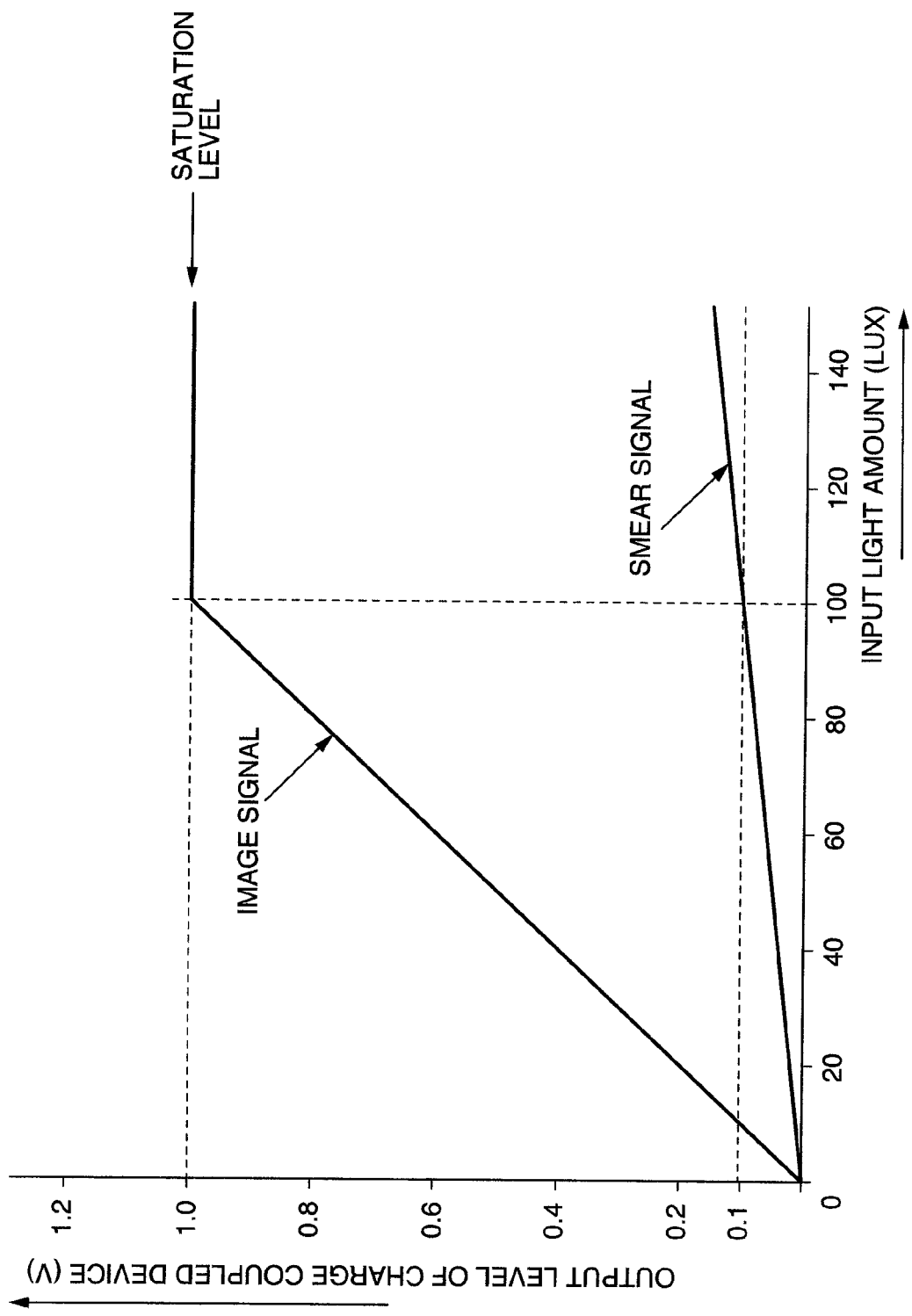
FIG. 4 is a diagram for explaining a relation between an image signal which is outputted from the charge coupled device and a smear signal.

FIG. 4 shows an example for explaining a relation between the image signal which is outputted from the charge coupled device and the smear signal. The image signal of the charge coupled device is saturated when the incident light amount is equal to 100 lux. A saturation level at this time is equal to 1.0V and the smear signal is equal to 10% of the image signal. However, the smear signal increases even if the image signal is saturated.

Figure 5:
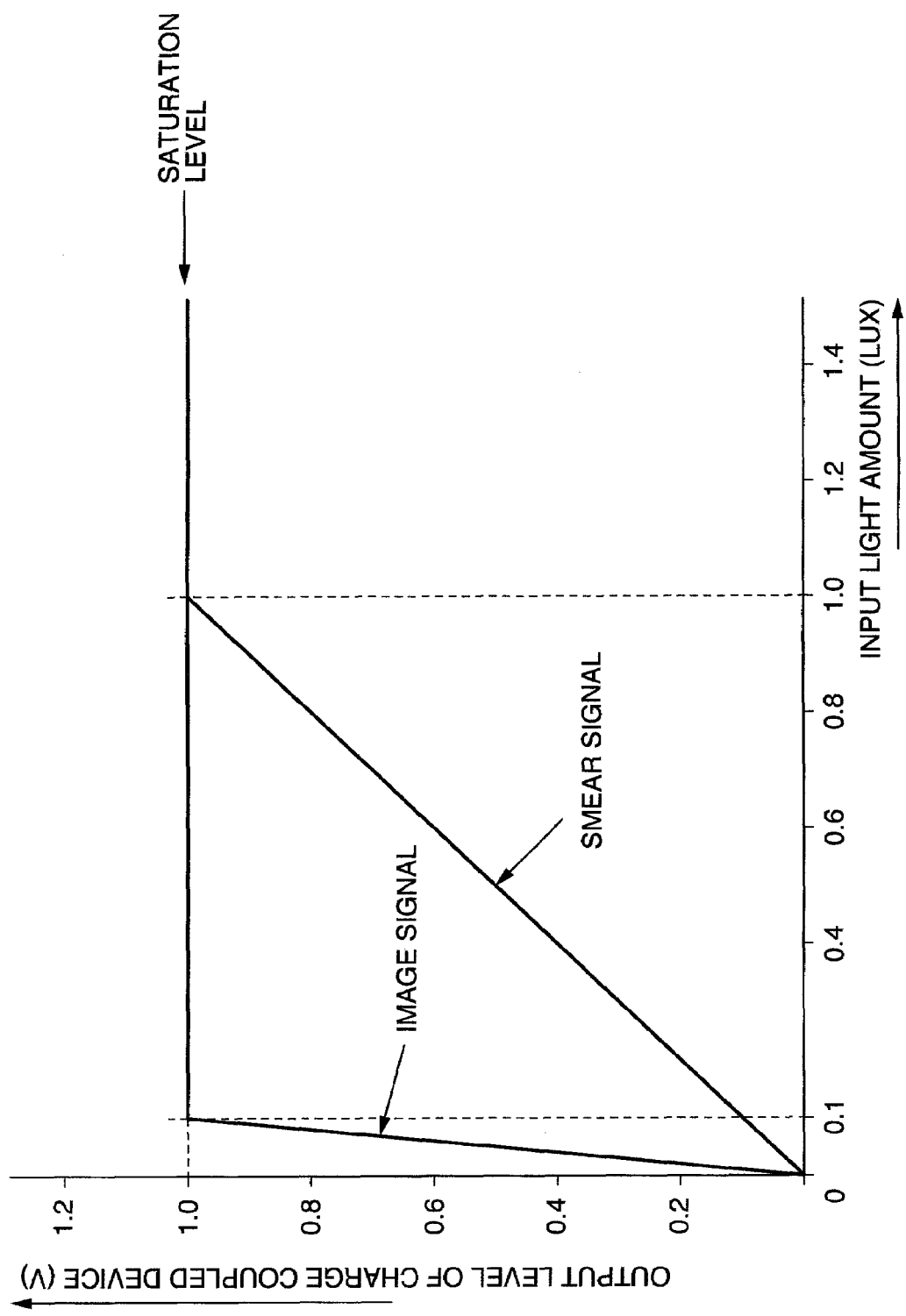
FIG. 5 is a diagram for explaining a relation between an image signal which is outputted from an electron multiplying-charge coupled device and the smear signal.

FIG. 5 shows an example for explaining a relation between the smear signal and an image signal which is outputted from an electron multiplying-charge coupled device in the case where the charge coupled device of FIG. 4 is of the electron multiplying type and the electron multiplying magnification is set to 1000 times. The image signal of the electron multiplying-charge coupled device is saturated when the incident light amount is equal to 0.1 lux. A saturation level in this instance is equal to 1.0V and the smear signal is equal to 10% of the image signal. However, the smear signal increases even if the image signal is saturated. The smear signal is also saturated at 1.0 lux.

According to the invention, on the basis of such a feature of the smear, by detecting the smear signal from the light-shielded pixels and subtracting the smear signal from the image signal obtained by photoelectrically converting the incident light, the smear is corrected.

The operation of the detection of the smear signal which is outputted from the EM-CCD 3 and the correction according to the embodiment of the invention will now be described with reference to FIGS. 2 to 6.

Figure 6:
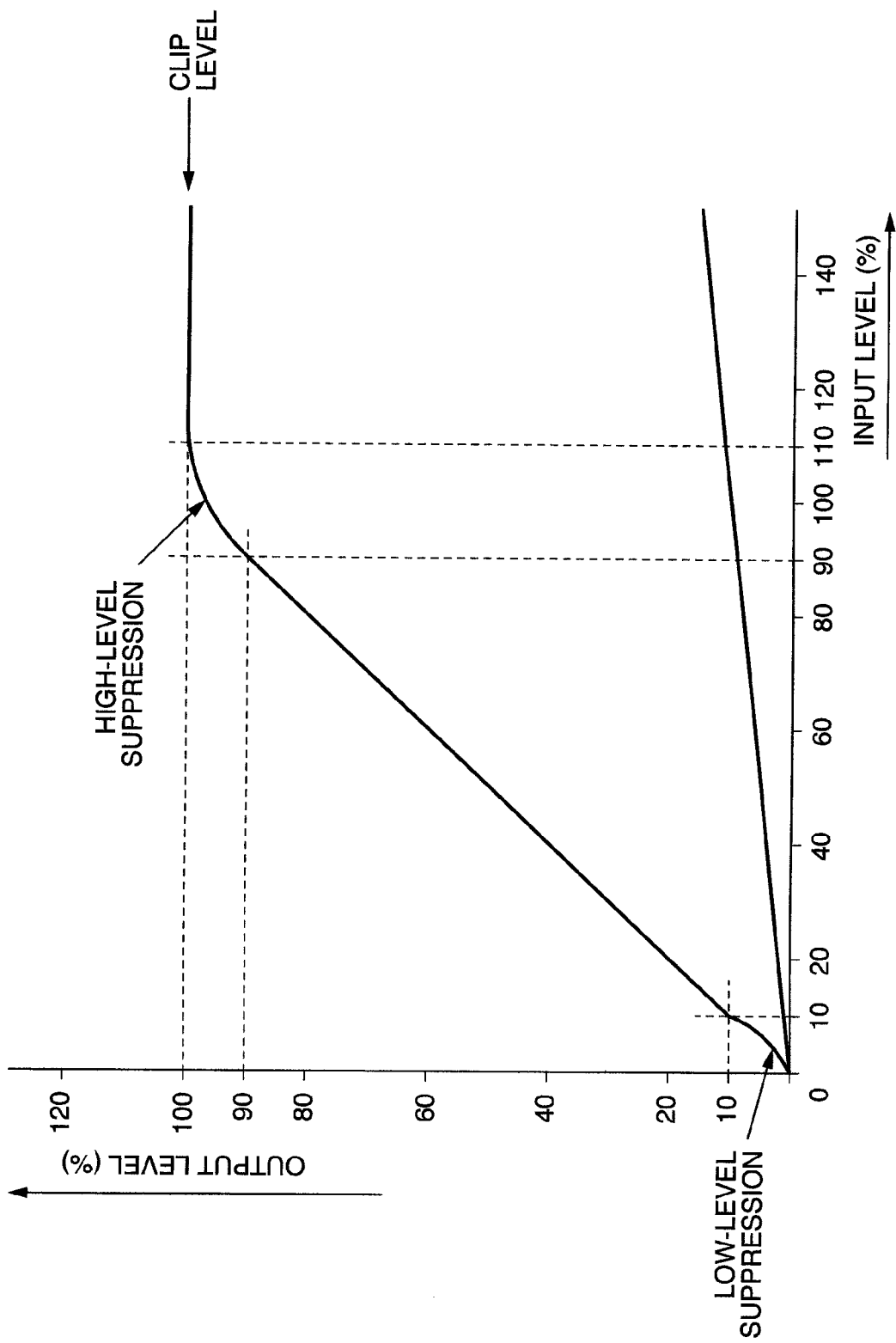
FIG. 6 is a diagram for explaining a low-level suppression and a high-level suppression of a smear correction signal according to the embodiment of the invention.

FIG. 3 is a diagram for explaining a pixel array of the charge coupled device. FIG. 6 is a diagram for explaining the low-level suppression and the high-level suppression of a smear correction signal according to the embodiment of the invention.

FIG. 3 is a diagram showing the pixel array of the charge coupled device. One square indicates one pixel. A numeral written in the square indicates a layout of the pixel, the tens digit indicates the row, and the units digit indicates the column. The pixel array is separated into two areas: an area where the pixels are light-shielded (optical black area); and an area where the pixels are not light-shielded, that is, an image pickup area where the incident light is photographed. In the optical black area, the pixels of the first line are arranged in order of B11, B12, B13, B14, B15, . . . , and B1M; the pixels of the second line are arranged in order of B21, B22, B23, B24, B25, . . . , and B2M; the pixels of the third line are arranged in order of B31, B32, B33, B34, B35, . . . , and B3M; . . . ; and the pixels of the nth line are arranged in order of Bn1, Bn2, Bn3, Bn4, Bn5, . . . , and BnM. In the image pickup area, the pixels of the first line are arranged in order of S11, S12, S13, S14, S15, . . . , S1M; the pixels of the second line are arranged in order of S21, S22, S23, S24, S25, . . . , S2M; the pixels of the third line are arranged in order of S31, S32, S33, S34, S35, . . . , S3M; . . . ; and the pixels of the Nth line are arranged in order of SN1, SN2, SN3, SN4, SN5, . . . , SNM. n, M, and N are natural numbers. The order of the pixels for reading out the video signal is also the same as that of the pixel array mentioned above. That is, the video signal is read out in order of B11, B12, B13, . . . , and BNM.

In the invention, the image signal and the smear signal are read out on a field or frame unit basis from the charge coupled device shown in FIG. 3. The smear signal is read out of the pixels in the light-shielded optical black area. The image signal is read out of the pixels of the light-unshielded image pickup area.

The operation of the detection of the smear signal and the correction will now be described with reference to FIG. 2.

The signal A which is inputted to the smear correction unit 7 in FIG. 2 contains the signals of the pixels of each line in the optical black area and the image pickup area. The signals of the pixels of the first line in the optical black area in FIG. 3 are stored into the memory unit 701-1 in FIG. 2. The signals of the pixels of the second line in the optical black area are stored into the memory unit 701-2. The signals of the pixels of the third line in the optical black area are stored into the memory unit 701-3. In this manner, the signals of the pixels of the subsequent lines are sequentially stored into the memory units, and the signals of the pixels of the nth line in the optical black area are stored into the memory unit 701-n. The signals stored in the memory units 701-1 to 701n are outputted each time the signals of the pixels in the image pickup area in FIG. 3 are read out. That is, when the signals of S11, S21, S31, . . . , and SN1 are read out, the memory units 701-1 to 701-n output the signals of B11, B21, B31, . . . , and Bn1. The storage and output into/from the memory units 701-1 to 701-n are controlled by the signal a which is outputted from the control unit 715. The signals outputted from the memory units 701-1 to 701-n are added by the addition unit 702 and multiplied by 1/n time by the 1/n unit 703. The inter-line averaging process of the signals in the optical black area can be executed by the memory units 701-1 to 701-n, addition unit 702, and 1/n unit 703. The inter-line averaging is a process for adding the signals of B11, B21, B31, . . . , and Bn1 and multiplying the addition signal by 1/n time. Similarly, the inter-line averaging processes are executed in order of the column of B12, the column of B13, . . . , and the column of B1M.

Subsequently, the high-frequency components are eliminated from the inter-line averaged signal by a low-pass filter constructed by the delay unit 704, a delay unit 705, a coefficient unit 706, a coefficient unit 707, a coefficient unit 708, and an addition unit 709. Characteristics of the low-pass filter are set by the signal b which is outputted from the control unit 715.

As for the signal outputted from the addition unit 709, a first non-linear process is executed to the signals of the first predetermined level or higher as shown in FIG. 6 by the high-level suppression unit 710. In the first non-linear process, it is also possible to use such a function that the multiplying magnification of the electron multiplication increases and the change ratio of the electron multiplication decreases in accordance with an increase in input level. However, the invention is not limited to such a function. In the embodiment, assuming that a level of the smear signal when the image signal which is outputted from the EM-CCD 3 is saturated (1.0V in FIG. 4) is equal to 100% (0.1V in FIG. 4), the first non-linear process is executed by the high-level suppression unit 710 to the signal in which the smear signal level is equal to or larger than 90%. A clip is executed to the signal in which the smear signal level is equal to or larger than 110%. The first non-linear process in the high-level suppression unit 710 is set by the signal d which is outputted from the control unit 715. By the first non-linear process, even if the image signal is saturated, it is possible to prevent the smear correction from becoming overcorrection.

As for the signal outputted from the high-level suppression unit 710, a second non-linear process is executed to the signals of the second predetermined level or less as shown in FIG. 6 by the low-level suppression unit 711. In the second non-linear process, for example, it is also possible to use such a function that the multiplying magnification of the electron multiplication increases and the change ratio of the electron multiplication increases in accordance with the increase in input level. However, the invention is not limited to such a function. The first predetermined level and the second predetermined level may have same value or different values. In the embodiment, assuming that the smear signal level at the time when the image signal which is outputted from the EM-CCD 3 is saturated (1.0V in FIG. 4) is equal to 100% (0.1V in FIG. 4), the second non-linear process is executed to the signal in which the smear signal level is equal to or less than 10% by the low-level suppression unit 711. The second non-linear process in the low-level suppression unit 711 is set by the signal (e) which is outputted from the control unit 715. A level of the signal (e) may be set so as to be higher than a noise floor of a random noise. By the second non-linear process, since a random noise multiplexed to the optical black area is not subtracted from a random noise multiplexed to the image pickup area, the smear correction by which a natural image is obtained can be made.

The signal outputted from the low-level suppression unit 711 is inputted to the switching unit 712. The switching unit 712 is controlled by the signal which is outputted from the comparison unit 713. The comparison unit 713 compares the level of the signal which is outputted from the addition unit 709 with that of the signal (c) which is outputted from the control unit 715. When the level of the signal (c) is lower than that of the above output signal, the comparison unit 713 controls the switching unit 712 so that the signal which is outputted from the low-level suppression unit 711 is outputted as a signal (g) from the switching unit 712. If the level of the signal (c) is higher than that of the above output signal as a comparison result of the comparison unit 713, the comparison unit 713 controls the switching unit 712 so that the signal (f) which is outputted from the control unit 715 is outputted as a signal (g) from the switching unit 712. The signal (f) may be replaced by 0 (zero) or a predetermined value. The comparison unit 713 compares a smear correction signal level with a rated signal level which is outputted from the video signal output unit 9. When the smear correction signal level is equal to or larger than, for example, 10% of the rated signal level, the subtraction unit 714 subtracts the smear correction signal of 10% or more from the image signal of 100% so as to provide the image signal of 90% or less. That is, the comparison unit 713 and the switching unit 712 are provided to prevent the smear correction signal from exerting an influence on the image signal itself.

The subtraction unit 714 subtracts the signal (g) as a smear correction signal from the signal (A) and outputs the signal (L) in which the smear signal has been reduced.

Another embodiment of the invention will now be described with reference to FIGS. 2, 5, and 7 with respect to the operation of the detection of the smear signal which is outputted from the EM-CCD 3 and the correction.

Figure 7:
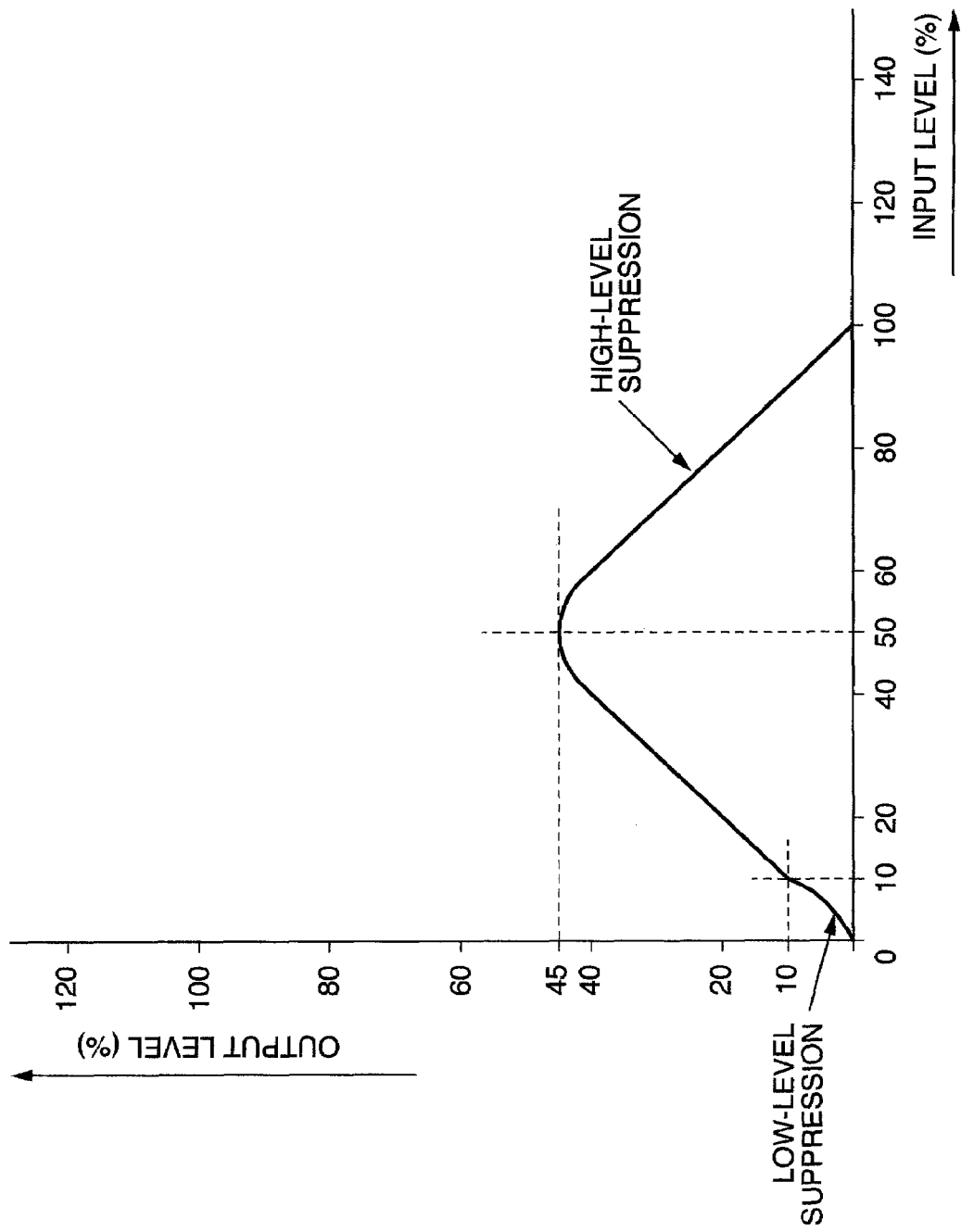
FIG. 7 is a diagram for explaining a low-level suppression and a high-level suppression of a smear correction signal according to another embodiment of the invention.

FIG. 7 is a diagram for explaining the low-level suppression and the high-level suppression of the smear correction signal according to another embodiment of the invention. In FIG. 2, since a construction other than the high-level suppression unit 710 is substantially the same as that in the foregoing embodiment, an explanation of the operation is omitted here.

In the case where the electron multiplying magnification of the EM-CCD 3 is set to 1000 times and a high-luminance object like a spotlight in which only one point is extremely brighter than the periphery is photographed as shown in FIG. 5, the smear signal is also immediately saturated. Another embodiment of the invention intends to change characteristics of the high-level suppression unit 710 in accordance with the multiplying magnification of the electron multiplication of the EM-CCD 3. For example, if the multiplying magnification of the electron multiplication of the EM-CCD 3 is equal to 1 time, the smear correction signal shown in FIG. 6 is used. With an increase in multiplying magnification of the electron multiplication, the smear correction signal shown in FIG. 7 is used. That is, the signal which is outputted from the addition unit 709 is converted into a rated output of the video signal output unit 9. When the rated output is equal to or larger than 50%, the smear correction signal is attenuated. When it is equal to or larger than 100%, the smear correction signal is set to 0 (zero). By providing such characteristics for the high-level suppression unit 710, the optimum smear correction can be made in accordance with the magnification of the electron multiplication of the EM-CCD 3. It is also possible to form the smear correction signal shown in FIG. 7 in accordance with the magnification of the electron multiplication of the EM-CCD 3 and an average level value obtained by averaging the image signals of one field or one frame and make the smear correction.

Although the high-level suppression unit 710 and the low-level suppression unit 711 are arranged in order after the addition unit 709 in the embodiment, the low-level suppression unit 711 and the high-level suppression unit 710 may be arranged in order after the addition unit 709. An amplifying function for level matching between the high-level suppression unit 710 and the low-level suppression unit 711 can be also provided. An amplification factor in the case of providing the amplifying function is controlled by the control unit 715.

As further another embodiment of the invention, in the smear correction unit 7 in FIG. 1, the detection of the smear signal and the correction can be also performed by using a computer such as a CPU (Central Processing Unit) or the like. An embodiment of the detection of the smear signal and the correction will be described with reference to FIG. 8.

Figure 8:
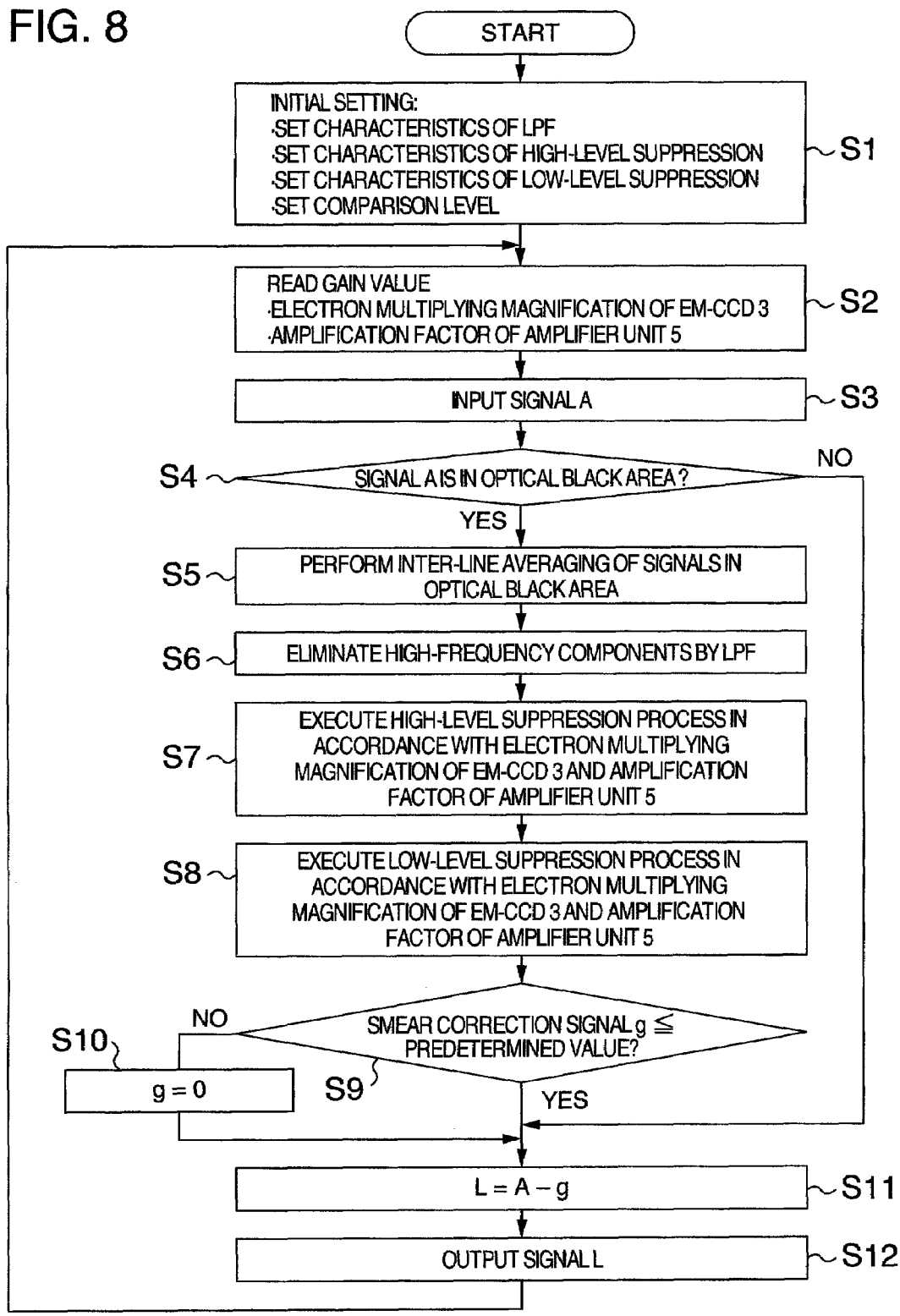
FIG. 8 is a flowchart for explaining the operation for a detection of a smear signal and a smear correction according to further another embodiment of the invention.

FIG. 8 is a flowchart for explaining processes regarding the operation for the detection of the smear signal and the smear correction according to another embodiment of the invention.

In step S1 in FIG. 8, an initial setting of low-pass filter characteristics, high-level suppression characteristics, low-level suppression characteristics, and a comparison level is made. In step S2, the electron multiplying magnification of the EM-CCD 3 and the amplification factor of the amplifier unit 5 are read out of the CPU 11. In step S3, the signal (A) is inputted. In step S4, whether or not the signal (A) is a signal of the optical black area is discriminated. If the signal (A) is the signal of the optical black area, the processing routine advances to step S5. If the signal (A) is the signal of the image pickup area, step S11 follows. In step S5, the inter-line averaging process of the signals of the optical black area is executed and step S6 follows. In step S6, the high-frequency components are eliminated by the low-pass filter and step S7 follows. In step S7, the high-level suppression process is executed in accordance with the electron multiplying magnification of the EM-CCD 3 and the amplification factor of the amplifier unit 5 and step S8 follows. In step S8, the low-level suppression process is executed in accordance with the electron multiplying magnification of the EM-CCD 3 and the amplification factor of the amplifier unit 5 and step S9 follows. In step S9, the level of the smear correction signal (g) as a signal processed in up to step S8 is compared with the initial-setting comparison level. If it is equal to or less than the comparison level, step S11 follows. If it is larger than the comparison level, step S10 follows. In step S10, the smear correction signal (g) is set to 0 (zero) and step S11 follows. In step S11, the smear correction signal (g) is subtracted from the signal (A) and step S12 follows. In step S12, the signal (L) is outputted.

Although the invention has been described in detail above, the invention is not limited to the image pickup device disclosed here and, naturally, the invention can be widely applied to image pickup devices other than the above device.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. An image pickup device having an electron multiplying-charge coupled device, comprising:
    an electron multiplying magnification control unit of said electron multiplying-charge coupled device;
    an obtaining unit for obtaining signals which are output from light-shielded pixels of said electron multiplying-charge coupled device;
    an averaging unit for executing an inter-line averaging process to the signals obtained by said obtaining unit;
    a suppression unit for performing a predetermined low-level suppression and a predetermined high-level suppression to the signal averaged by said averaging unit in accordance with the electron multiplying magnification of said electron multiplying magnification control unit;

a deriving unit for deriving image signals which are output from light-unshielded pixels of said electron multiplying-charge coupled device;

a subtraction unit for subtracting the signal suppressed by said suppression unit from the image signals derived by said deriving unit; and an image signal processing unit for subjecting image signals output from the subtraction unit to image processing, wherein the electron multiplying magnification control unit controls a gain of electron multiplying of said electron multiplying-charge coupled device in accordance with image signals output from the image signal processing unit.

2. The device according to claim 1, further comprising:

a comparison unit for comparing a level of the signal averaged by said averaging unit with a predetermined level; and a switching unit for disconnecting outputs of said suppression unit in accordance with a comparison result of said comparison unit.

3. The device according to claim 1, wherein when a level of said averaged signal is equal to or higher than a first predetermined level, said suppression unit executes the high-level suppressing process to said averaged signal.

4. The device according to claim 1, wherein when a level of said averaged signal is equal to or less than a second predetermined level, said suppression unit executes the low-level suppressing process to said averaged signal.

5. The device according to claim 3, wherein said high-level suppression is performed by using such a function that the multiplying magnification of the electron multiplication rises and a change ratio of the electron multiplication decreases in accordance with an increase in input level.

6. The device according to claim 3, wherein said high-level suppression is performed by using such a function that the multiplying magnification of the electron multiplication decreases in accordance with an increase in input level.

7. The device according to claim 4, wherein said second predetermined level is higher than a noise floor of a noise.

8. The device according to claim 4, wherein said low-level suppression is performed by using such a function that the multiplying magnification of the electron multiplication rises and a change ratio of the electron multiplication increases in accordance with an increase in input level.

9. A noise reduction method of an image pickup device having an electron multiplying-charge coupled device, comprising the steps of:

controlling an electron multiplying magnification of said electron multiplying-charge coupled device;

obtaining signals which are output from light-shielded pixels of said electron multiplying-charge coupled device;

executing an inter-line averaging process to said obtained signals;

performing a predetermined low-level suppression and a predetermined high-level suppression to said averaged signal in accordance with said electron multiplying magnification;

deriving image signals which are output from light-unshielded pixels of said electron multiplying-charge coupled device;

subtracting said suppressed signal from said derived image signals;

subjecting imaging signals output from the subtraction unit to image processing; and controlling a gain of electron multiplying of said electron multiplying-charge coupled device in accordance with image signals output from the image signal processing unit.

10. The method according to claim 9, further comprising the steps of:

comparing a level of said averaged signal with a predetermined level; and subtracting said suppressed signal from said image signals in accordance with a comparison result.

11. An image pickup device having an electron multiplying-charge couple device, comprising:

an electron multiplying magnification control unit of said electron multiplying-charge coupled device;

an obtaining unit for obtaining signals which are output from pixels of said electron multiplying-charge coupled device;

a separating unit for separating, from the signals obtained by the obtaining unit, signals of pixels which are light-shielded and signals of pixels which are not light-shielded;

an averaging unit for executing an inter-line averaging process to the signals of the pixels light-shielded by the separating unit;

a suppression unit for performing a predetermined low-level suppression and a predetermined high-level suppression to the signal averaged by said averaging unit in accordance with the electron multiplying magnification of said electron multiplying magnification control unit; and a subtraction unit for subtracting the signals suppressed by said suppression unit from the signals of the pixels which are not light-shielded by the separating unit.

* * * * *